United States Patent
Muramoto et al.

(10) Patent No.: US 6,875,821 B2
(45) Date of Patent: Apr. 5, 2005

(54) PROCESS FOR PRODUCTION OF PARTIALLY PROTECTED POLY (HYDROXYSTYRENE)S

(75) Inventors: Hiroo Muramoto, Chiba (JP); Shinichi Kimizuka, Chiba (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 10/466,390

(22) PCT Filed: Jan. 25, 2002

(86) PCT No.: PCT/JP02/00551
§ 371 (c)(1),
(2), (4) Date: Jul. 16, 2003

(87) PCT Pub. No.: WO02/059164
PCT Pub. Date: Aug. 1, 2002

(65) Prior Publication Data
US 2004/0063863 A1 Apr. 1, 2004

(30) Foreign Application Priority Data
Jan. 26, 2001 (JP) ........................................ 2001-018983

(51) Int. Cl.$^7$ ................................................. C08F 8/00
(52) U.S. Cl. .................... 525/344; 525/328.9; 525/340; 525/353; 525/355
(58) Field of Search ............................ 525/328.9, 344, 525/340, 353, 355, 313

(56) References Cited
U.S. PATENT DOCUMENTS
5,580,936 A * 12/1996 Tsuchiya et al. ............ 525/340

FOREIGN PATENT DOCUMENTS
| EP | 0 366 590 A2 | 5/1990 |
| EP | 0 588 544 A2 | 3/1994 |
| JP | 08104708 | 4/1996 |
| JP | 2001-178325 A | 6/2000 |
| JP | 2001-310913 A | 11/2001 |
| JP | 2001-316418 A | 11/2001 |

OTHER PUBLICATIONS

K.E. Uhrich et al., "Formation of Polymers Containing 4–Hydroxystyrene via Hydrolysis of 4–((Trimethylsilyl)oxy)styrene," American Chemical Society, vol. 27, No. 18, pp. 4936–4940, (1994).

* cited by examiner

Primary Examiner—Fred Teskin
(74) Attorney, Agent, or Firm—Dennis G. LaPointe; Mason Law, P.L.

(57) ABSTRACT

A process for making poly(hydroxystyrene)s whose phenolic hydroxyl groups are partially protected by acid-decomposable or -eliminable groups, by which the degree of deblocking of the phenolic hydroxyl groups is controlled. Namely, the production of a polymer containing, in the molecule, repeating units of the general formula (IA) and those of the general formula (IB), comprising adding an acid to polymer (B) containing in the molecule repeating units of general formula (II) in an organic solvent with the molar ratio of the acid to the $OR_3$ group being 0.0001 equivalent or above but below 0.05 equivalent, and reacting the polymer with the acid. In the general formulae, $R_1$ is hydrogen or methyl; $R_2$ is $C_{1-6}$ alkyl; $R_3$ is an acid-decomposable or -eliminable group; $R_4$ is hydrogen or a group derived from $R_3$ by decomposition with acid; and p is 0, 1, or 2, with the proviso that the IB/IA molar ratio ranges 98/2 to 30/70.

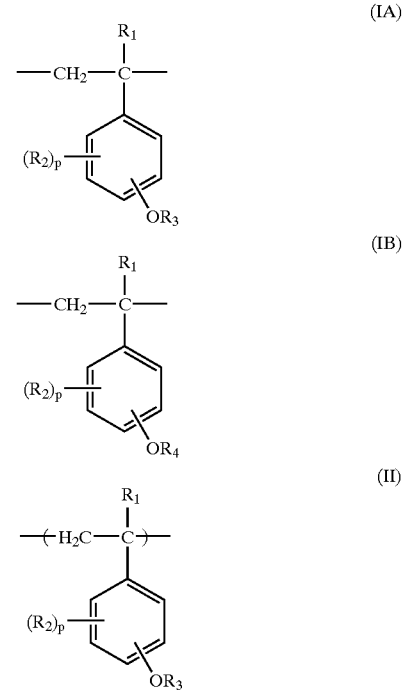

29 Claims, No Drawings

PROCESS FOR PRODUCTION OF PARTIALLY PROTECTED POLY (HYDROXYSTYRENE)S

TECHNOLOGICAL FIELDS

The present invention relates to processes for the preparation of poly(hydroxystyrene)s whose phenolic hydroxyl groups in a molecule are partially protected. The polymers are useful as various functional materials including resist materials.

BACKGROUND ART

Resins that part of the hydroxyl groups of polyhydroxystyrene is substituted with tert-butoxycarbonyloxy (t-Boc) groups have been disclosed as base polymers to be used for materials of chemically-amplified resists (in Japanese Patents Laid-open Nos. Sho 59-45439 and Sho 62-115440 and others).

A variety of poly(p-hydroxystyrene)s partially protected with the tert-butoxy group, that is, the hydroxyl groups of poly(hydroxystyrene) are partially substituted with tert-butoxy groups, and processes for their preparation have also been proposed.

Firstly, the poly(hydroxystyrene) partially protected with the tert-butoxy group is produced by copolymerization of tert-butoxystyrene and p-hydroxystyrene. A disadvantage of this process is however that p-hydroxystyrene is a highly self-polymerizing monomer with difficulties of handling and polymerization control.

Secondly, poly(p-hydroxystyrene) is reacted with isobutene to give the poly(hydroxystyrene) partially protected with the tert-butoxy group. In this process, the synthetic route is very complicated such that a hydroxystyrene derivative with its hydroxyl group protected is first polymerized, then the hydroxyl group of the obtained polymer is deprotected and further the product is reacted with isobutene. Besides, isobutene cannot be added to the hydroxyl group as calculated from the amount added. Therefore, it is difficult to introduce a designed quantity of the tert-butoxy group.

Thirdly, the poly(hydroxystyrene) partially protected with the tert-butoxy group is produced by a partial elimination reaction of poly(p-tert-butoxystyrene). In this process, poly(p-tert-butoxystyrene) is synthesized by radical or anion polymerization or the like of p-tert-butoxystyrene, and the tert-butoxy group of the polymer is partially removed with an acid catalyst.

In this process, simple changes of addition amounts of an acid catalyst required for the reaction did not result in the production of the poly(hydroxystyrene) partially protected with the tert-butoxy group as designed, because the elimination reaction proceeds catalytically. A tert-butoxy group ratio [a ratio of the tert-butoxy group bound to the phenolic hydroxyl group in poly(hydroxystyrene) partially substituted with the tert-butoxy group] is particularly one of important factors to determine resist characteristics such as a dissolving rate in a developer. It is therefore very important to accurately control the tert-butoxy group ratio for producing highly sensitive resists with high resolution. It is therefore necessary to develop processes for producing poly(hydroxystyrene)s partially substituted with tert-butoxy groups with the tert-butoxy group ratios as designed.

To solve the above problems, Japanese Patent Laid-open No. Hei 8-1047808 has disclosed processes for the preparation of poly(hydroxystyrene)s partially protected with the tert-butoxy groups by that poly(p-tert-butoxystyrene) is reacted with an acid catalyst at a molar ratio of 0.05 to 2.0 to the tert-butoxy group of the polymer, changes in the solubility in water of the produced poly(hydroxystyrene) partially protected with the tert-butoxy group are determined, and the reaction is terminated when the desired amount of the tert-butoxy group is eliminated. This process is simpler than the above first to third processes, and makes it possible to control the degree of deprotection.

A drawback of this process is however requirements of quantitative analyses of the solubility of the product, poly(hydroxystyrene) partially protected with the tert-butoxy group, in water by sampling the reaction solution at fixed intervals. A quantitative analysis needs a certain time to complete. There was a limit to the control of the degree of deprotection because the reaction proceeded while the quantitative analysis was carried out. More accurate control of the tert-butoxy group ratio is particularly required to meet today's demand for more highly sensitive resists with higher resolutions.

The solubility of a polymer is by nature in a certain range. It is difficult to control the degree of deprotection, for example, within ±2% of the target degree, only by observing solubility changes.

DISCLOSURE OF THE INVENTION

The present invention was carried out in consideration of the current conditions mentioned above. It is an object of the present invention to provide processes for the preparation of poly(hydroxystyrene)s that the phenolic hydroxyl groups in the molecules are partially protected by acid-decomposable or -eliminable groups [hereinafter referred to as "partially protected poly(hydroxystyrene)s" in the present invention], wherein the degrees of deblocking the protecting groups of the phenolic hydroxyl groups can be controlled easily and accurately without fail.

To work out the solution to the above object, the inventors studied in detail acid-decomposition and elimination reactions (hereinafter referred to as "elimination reactions") that poly(hydroxystyrene) whose phenolic hydroxyl group is protected by an acid-decomposable protecting group (hereinafter referred to "acid-decomposable or -eliminable group") is treated with an acid.

Favorable conditions under which the degree of deblocking the acid-decomposable or -eliminable group of Polymer (B) can be accurately controlled have been found. Thus the present invention was completed.

The present invention firstly relates to a process for the preparation of the partially protected poly(hydroxystyrene)s characterized in that it is a process for producing Polymer (A) having a repeating unit represented by Formula (IA)

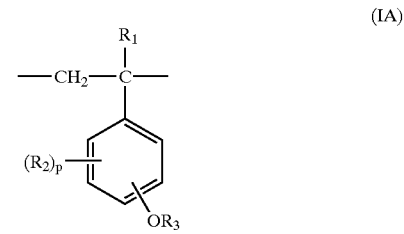

(IA)

(wherein, $R_1$ is hydrogen or methyl, $R_2$ is alkyl having 1 to 6 carbons, $R_3$ is an acid-decomposable or -eliminable group and p is 0, 1 or 2, and $R_2$ may be the same or different when p is 2), and a repeating unit represented by Formula (IB)

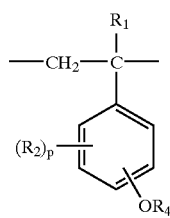

(IB)

(wherein, $R_1$, $R_2$ and p are as defined above, and $R_4$ is hydrogen or a group derived from $R_3$ by decomposition with an acid) at a molar ratio (IB/IA) of 98/2 to 30/70 in a molecule, and the process contains a step that Polymer (B) having a repeating unit represented by Formula (II)

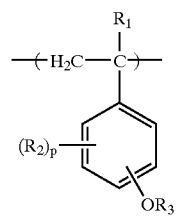

(II)

(wherein, $R_1$, $R_2$, $R_3$ and p are as defined above) in a molecule is reacted in an organic solvent with an acid added at a molar ratio of 0.0001 equivalents or more and less than 0.05 equivalents to the $OR_3$ group.

The present invention secondly relates to a process for the preparation of the partially protected poly(hydroxystyrene)s characterized in that it is a process for producing Polymer (A) having the repeating units of Formula (I) in a molecule, and has Step (1) that Polymer (B) with the repeating unit of Formula (II) in a molecule is reacted with an acid at a specified temperature (T1) and Step (2) that the polymer is reacted with the acid at a specified temperature (T2) lower than (T1).

In the present invention (hereinafter referred to the above first and/or second inventions), it is preferable to use sulfuric acid, more preferably an acid diluted with a diluent to 10 to 70% by weight, as the acid mentioned above. In this case, a preferred diluent is water or an alcohol having 1 to 4 carbons.

As the aforementioned organic solvent, favorably used is a mixed organic solvent consisting of a solvent (S1) in which the solubility of Polymer (A) is relatively high and that of Polymer (B) is relatively low and a solvent (S2) in which the solubility of Polymer (A) is relatively low and that of Polymer (B) is relatively high.

A mixed solvent of an aromatic hydrocarbon and an alcohol having 1 to 4 carbons is more preferred to use as the said organic solvent, and much more preferred is a mixed solvent of an aromatic hydrocarbon and an alcohol having 1 to 4 carbons at a mixing ratio by weight of 4/1 to 1/4.

In the present invention, it is more favorable to carry out Step (1) that Polymer (B) is reacted at a specified temperature (T1), prior to Step (2) that the polymer is reacted at a specified temperature (T2) lower than (T1). The specified temperature (T1) is more favorably 50 to 80° C., and (T2) 40 to 60° C.

Step (1) is preferably a step for deprotecting 60 to 90% of the $OR_3$ group necessary to decompose or remove finally. In Step (2), it is favorable to carry out the reaction with a certain amount of water added to the reaction solution. More favorable is that the reaction is carried out with water of 0.5 to 10 times, in part by weight, the amount of an acid used, added to the reaction solution.

Preferred polymers to be used as Polymers (A) and (B) in the present invention have, in addition to the said repeating units, (1) a repeating unit of Formula (III)

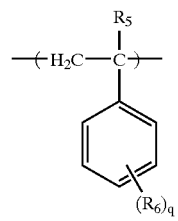

(III)

(wherein, $R_5$ is hydrogen or methyl, $R_6$ is alkyl having 1 to 6 carbons, q is 0, 1 or 2, and R6 may be the same or different when q is 2) in a molecule; (2) a repeating unit of Formula (IV)

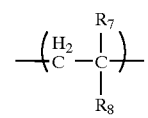

(IV)

[wherein, $R_7$ is hydrogen or methyl, $R_8$ is alkyl having 1 to 12 carbons, a group represented by Formula $CO_2R_9$ (wherein, $R_9$ is alkyl having 1 to 12 carbons, hydrocarbon having an alicyclic skeleton of 3 carbons or more, aryl or heteroaryl), CN, a group represented by CONr1r2 (wherein, r1 and r2 are, each independently, hydrogen or optionally substituted alkyl having 1 to 12 carbons), hydrocarbon having an alicyclic skeleton of 3 carbons or more or heteroaryl] in a molecule; or (3) the repeating units of Formulae (III) and (IV).

In the present invention, Polymer (B) having a number-average molecular weight of 1,000 to 50,000 is preferably used.

The present invention provides processes for the preparation of poly(hydroxystyrene)s in which the degree of the protection of the phenolic hydroxyl group is controlled easily and highly without fail.

The present invention is described in more detail.

In the present invention, Polymer (B) having the repeating unit represented by Formula (II) [hereinafter referred to as "Repeating Unit (II)"] as an essential constituent is used as a starting material.

In Formula (II), $R_1$ is hydrogen or methyl, and $R_2$ is alkyl having 1 to 6 carbons such as methyl or ethyl.

$R_3$ is an acid-decomposable or -eliminable group, wherein the acid-decomposable or -eliminable group refers to a group that is decomposed and/or removed by an acid. Examples of the group include protecting groups that decompose under acidic conditions to produce OH or $CO_2H$ groups in molecules.

Actual examples of structural units having the acid-decomposable or -eliminable groups include methoxymethyl, bis(2-chloroethoxy)methyl, tetrahydropyranyl, 4-methoxytetrahydropyranyl, tetrahydrofuranyl, triphenylmethyl, trimethylsilyl, 2-(trimethylsilyl)ethoxymethyl, tert-butyldimethylsilyl, trimethylsilylmethyl, tert-butyl, tert-butoxycarbonyl, tert-butoxycarbonylmethyl and 1,1-dimethyl-1-tert-butoxycarbonylmethyl.

Examples of $R_3$ include groups represented by the following formula:

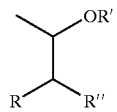

(wherein, R is non-substituted or alkoxy-substituted alkyl having 1 to 20 carbons, cycloalkyl having 5 to 10 carbons, or non-substituted or alkoxy-substituted aryl having 6 to 20 carbons; R' is hydrogen or alkyl having 1 to 3 carbons; and R" is hydrogen, alkyl having 1 to 6 carbons or alkoxy having 1 to 6 carbons).

Actual examples of such substituents include 1-methoxyethyl, 1-ethoxyethyl, 1-methoxypropyl, 1-methyl-1-methoxyethyl and 1-(isopropoxy)ethyl.

p is 0, 1 or 2. When p is 2, $R_2$ may be the same of different.

There no restrictions on the substitution position of the alkoxy ($OR_3$) group. Preferred is the meta or para position to the alkenyl group.

Polymer (B) may have, in a molecule, a structure that a repeating unit represented by Formula (III)

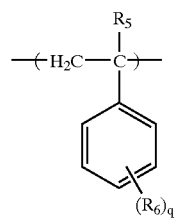

(III)

[hereinafter referred to as "Repeating Unit (III)"] is further copolymerized, in addition to the repeating unit of Formula (II). Such a copolymerization structure can have the repeating units arranged in any way. Its examples include structures of the repeating units produced by random, block or alternating copolymerization.

In addition, Polymer (B) can contain repeating units other than Repeating Units (II) and (III), if necessary. Such a repeating unit is exemplified by a repeating unit

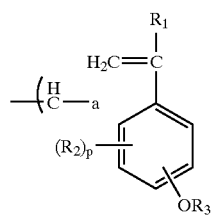

(V)

represented by Formula (IV)
(wherein, $R_7$ and $R_8$ are as defined above) [hereinafter referred to as "Repeating Unit (IV)"].

In Repeating Unit (III), $R_5$ is hydrogen or methyl; $R_6$ is alkyl having 1 to 6 carbons such as methyl, ethyl, n-propyl or isopropyl; q is 0, 1 or 2, and $R_6$ may be the same or different when q is 2.

In the present invention, use of Polymer (B) where $R_3$ is tert-butyl and/or 1-ethoxyethyl is particularly preferred from the viewpoint of easiness of acquisition, ease of decomposition and elimination with acid and easy control of the degree of deprotection.

$R_3$ in the repeating unit of Formula (IA) contained in Polymer (A) and in the repeating unit of Formula (II) contained in Polymer (B) can be all exactly the same or two or more different functional groups mixed in a molecule.

Polymer (B) can have any molecular weight. Its number-average molecular weight is preferably within a range of 1,000 to 50,000. There is no limit on a ratio (Mw/Mn) of weight-average molecular weight (Mw) to number-average molecular weight (Mn), which represents a degree of dispersion. It is preferably within a range of 1.00 to 1.50.

Polymer (B) can be produced by (co)polymerization of, for example, only hydroxystyrene (V) of the following formula whose phenolic hydroxyl group is protected with an acid-decomposable or -eliminable group of $R_3$
(wherein, $R_1$, $R_2$, $R_3$ and p are as defined above); the hydroxystyrene (V) and a styrene compound of Formula (VI)

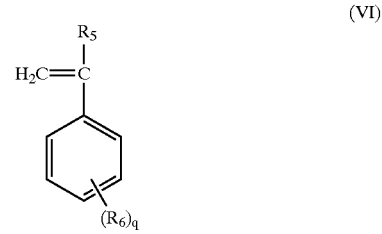

(VI)

(wherein, $R_5$, $R_6$ and q are as defined above); the hydroxystyrene (V) and a (meth)acrylic compound represented by Formula (VII)

(VII)

(wherein, $R_7$ and $R_8$ are as defined above); or the hydroxystyrene (V), styrene compound (VI) and (meth)acrylic compound of Formula (VII).

Repeating Units (II) and (III) can be polymerized in any mode. Random, block or alternating copolymerization can be applied. Repeating Unit (IV) can be random- or block-copolymerized with Repeating Unit (II) or with Repeating Units (II) and (III) to be contained in Polymer (B).

In Formula (VII), $R_7$ is hydrogen or methyl. $R_8$ is alkyl having 1 to 12 carbons such as methyl, ethyl, n-propyl, isopropyl, n-butyl, t-butyl, n-pentyl or n-hexyl; a group represented by Formula $CO_2R_9$ such as carboxyl, methoxycarbonyl, ethoxycarbonyl, n-propoxycarbonyl, isopropoxycarbonyl, n-butoxycarbonyl, tert-butoxycarbonyl or phenoxycarbonyl; CN; a group represented by Formula $CONr1r2$ such as amide, N-methylamide, N-ethylamide, N-benzylamide or N,N-dimethylamide; hydrocarbon having an alicyclic skeleton of 3 carbons or more such as cyclopropyl, cyclopentyl or cyclohexyl; or heteroaryl such as 2-furanyl, 3-furanyl, 2-thienyl, 3-thienyl, 2-pyranyl, 4-pyranyl, 2-pyridyl, 3-pyridyl, 4-pyridyl, 1,3-dioxan-2-yl or 1,3-dioxoran-2-yl.

Examples of such compounds include (meth)acrylic acid, (meth)acrylic acid esters, (meth)acrylamide and their derivatives, (meth)acrylonitrile (wherein, "(meth)acrylic" stands for acrylic and/or methacrylic), and other compounds containing vinyl groups.

Examples of the other compounds containing vinyl groups include vinyl ketones such as methyl vinyl ketone and ethyl vinyl ketone; and vinyl ethers such as methyl vinyl ether and ethyl vinyl ether.

In addition, in the present invention, compounds of Formula $CH_2=C(R_7)CO_2R_9$ (wherein, $R_7$ is as defined above) where $R_9$ is a group represented by one of the following formulae

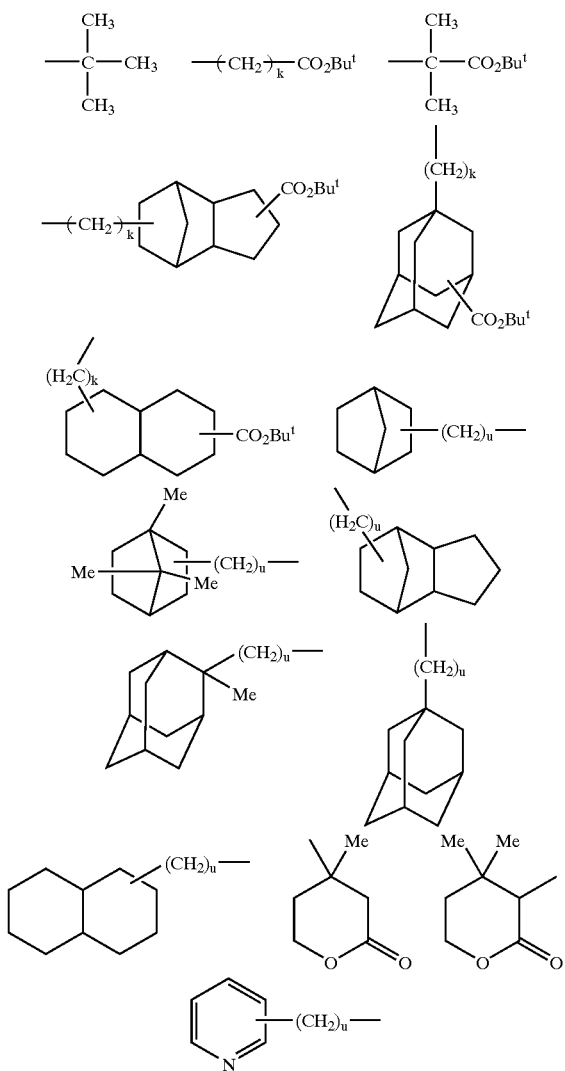

(wherein, k and u are each 0 or 1) can also be used. The compound of Formula (VII) can be used of only one type or a mixture of two types or more.

Compounds of Formulae (V), (VI) and (VII) can be (co)polymerized by any method including anion, cation and radical polymerization. Among these polymerization methods, anion polymerization by adding an alkali metal, organic alkali metal or the like to an organic solvent solution is preferably used to produce Polymer (B). (For more details, refer to Japanese Patents Laid-open Nos. Sho 63-36602, Hei 1-342713, Hei 3-200811, Hei 6-298869 and others.)

Examples of organic solvents used include aliphatic hydrocarbons such as pentane, hexane, heptane, octane, cyclopentane and cyclohexane; and aromatic hydrocarbons such as benzene, toluene, nomochlorobenzene and xylene.

Examples of applicable organic lithium compounds include n-butyl lithium, sec-butyl lithium and tert-butyl lithium.

The present invention relates to a process for the preparation of Polymer (A) having the repeating units of Formula (I) in a molecule, that is, partially protected poly(hydroxystyrene), by that Polymer (B) obtained in such a way as described in the above is reacted with an acid in an appropriate organic solvent to partially eliminate the acid-decomposable or -eliminable group protecting the phenolic hydroxyl group of Copolymer (B).

Examples of organic solvents able to be used include, as nonpolar solvents, aliphatic hydrocarbon solvents such as pentane, hexane, heptane, octane, cyclopentane and cyclohexane; and aromatic hydrocarbon solvents such as benzene, toluene, monochlorobenzene and xylene; and, as polar solvents, alcoholic solvents such as methanol, ethanol, n-propyl alcohol, isopropyl alcohol and n-butanol; ether-type solvents such as tetrahydrofuran, diethyl ether, 1,4-dioxane and 1,2-dimethoxyethane; amide-type solvents such as N-methylpyrolidone, N,N-dimethylformamide and N-dimethylacetamide; ketone-type solvents such as acetone, methyl ethyl ketone and methyl isobutyl ketone; and ester-type solvents such as methyl acetate, ethyl acetate and propyl acetate; and mixed solvents of two or more of these solvents.

Preferred solvents to be used among them in the present invention are mixed solvents consisting of a solvent (S1) in which Polymer (A) is highly soluble and Polymer (B) is less soluble and a solvent (S2) in which Polymer (A) is less soluble and Polymer (B) is highly soluble. Generally such a solvent (S1) is a polar solvent and solvent (S2) a nonpolar solvent.

A preferred mixed solvent used in the present invention consists of an alcohol having 1 to 4 carbons as Solvent (S1) and an aromatic hydrocarbon as Solvent (S2). Use of toluene and ethanol is particularly preferred. It is not advantageous to use only an aromatic hydrocarbon because a reaction product is deposited as the reaction proceeds. On the other hand, Polymer (B) does not dissolve if only an alcoholic solvent is used. It may be considered to use organic solvents in which both of Polymers (A) and (B) are soluble, such as tetrahydrofuran and acetone. Their drawbacks are insufficient effects on retarding the reaction by adding water and difficulty of accurate controls particularly in mass-production.

Use of a mixed solvent of Solvents (S1) and (S2) at a weight ratio (S1/S2) of 4/1 to 1/4 is more preferred to control the degree of deprotecting the $OR_3$ group more accurately.

An amount of solvent used differs depending on a quantity of poly(hydroxystyrene) [hereinafter may be referred to as "the resin"] contained. A concentration of the resin is usually 20 to 60% by weight, favorably 20 to 50% by weight.

Examples of acids used in the present invention include hydrogen chloride, sulfuric acid, phosphoric acid, hydrobromic acid, p-toluenesulfonic acid, acetic acid and trifluoroacetic acid. Among them, hydrogen chloride and sulfuric acid are preferably used. It is particularly favorable to use sulfuric acid from the viewpoint of operationability and easy reaction control. When an acid is used, it is preferable to add a diluent to the acid to dilute to 10 to 70% by weight in order to control the reaction more accurately. Use of sulfuric acid diluted with a diluent is particularly favored because the reaction product might be partially carbonized if concentrated sulfuric acid itself is used.

Examples of diluents include water; alcohols having 1 to 4 carbons such as methanol, ethanol, n-propanol, isopropanol, n-butanol and tert-butanol; and denatured ethanols that ethyl acetate, isopropanol or the like is added to ethanol. A diluent is added to a reaction solution by, for example, adding an acid diluted to 10 to 70% by weight in concentration beforehand, or adding the acid to the reaction solution followed by adding the diluent at the initial stage of the reaction or while the reaction proceeds. When the latter method is applied, the diluent can be added over two or more times.

Among the acids, preferred for use is aqueous sulfuric acid that sulfuric acid is diluted with water to 10 to 70% by weight; an acid, such as concentrated sulfuric acid, diluted with an appropriate diluent to 10 to 70% by weight; or an acid diluted with an alcohol having 1 to 4 carbons. More preferred to use is aqueous sulfuric acid of a concentration of 10 to 70% by weight or an acid diluted with an alcohol having 1 to 4 carbons to 10 to 70% by weight.

An addition amount of acid can be arbitrarily determined depending on reaction temperature, reaction time, concentration of the resin, target degree of eliminating the acid-decomposable or -eliminable group and other conditions. It is favorable to add an acid within a range of 0.0001 moles or more and less than 0.05 moles in molar ratio to a mole of the $OR_3$ group of Polymer (B). An addition of less than 0.001 moles results in a longer reaction time, is less economical, and causes difficult reaction control due to the effect of a tiny amount of moisture contained in the reaction system. On the other hand, if an acid of more than 0.05 moles is added, it becomes difficult to control the reaction accurately because it proceeds too fast.

The step for eliminating the $R_3$ group of Polymer (B) is favorably carried out in at least two separate steps: Step (1) that the polymer is reacted with an acid at a specified temperature (T1) and Step (2) that the reaction of the polymer with the acid is carried out at a specified temperature (T2) lower than the said temperature (T1). That the reaction is carried out in the two separate steps makes it possible to reduce the total reaction time and to control the degree of deprotection more accurately. In this case, Step (1) is preferably preformed prior to Step (2): The reaction progress is examined by one of the analytical methods described below to confirm that the target degree of deprotection is met, and then the elimination reaction of Step (2) is carried out.

In Step (1), a specified amount of an acid is added to a solution of Polymer (B) to stir so that the degree of deprotecting the reaction product is 10 to 90%, preferably 60 to 90%. The specified temperature (T1) in Step (1) ranges 50° C. to 80° C., preferably 60° C. to 70° C. A reaction carried out at lower than 50° C. is disadvantageous in work efficiency because the reaction rate becomes too slow. Contrary to it, if higher than 80° C., the entire acid-decomposable or -eliminable group is eliminated in a short time. It becomes therefore difficult to accurately control the degree of deprotection.

In Step (2), a reaction is favorably carried out at a temperature (T2) lower than (T1), that is, 40° C. to 60° C. A reaction carried out at lower than 40° C. is disadvantageous in work efficiency because the reaction rate becomes too slow. Contrary to it, if more than 60° C., the entire acid-decomposable or -eliminable group is eliminated in a short time. It becomes therefore difficult to accurately control the degree of deprotection.

In the deprotection step, a reaction is preferably carried out at a temperature within ±5° C., favorably ±2° C., of the set temperature in order to accurately control the degree of elimination of the acid-decomposable or -eliminable group. A reaction time is usually several minutes to several 10 hours, differing depending on reaction temperature, amount of the resin used and other conditions. This reaction generates isobutene and others. It is advisable to carry out the reaction in an atmosphere of inert gas such as nitrogen gas.

To carry out the reaction, favorably applied is either use of an acid diluted with water to a specified concentration from the beginning or only an acid added at the start followed by adding water when the degree of deprotection reaches the target value. The latter is preferred as a method for making the reaction proceed efficiently particularly when producing poly(hydroxystyrene) partially substituted with the tert-butyl group with high degree of deprotection.

When a method of adding water while the reaction is proceeding is applied, water is added at an amount so that the moisture content in the reaction system is within a range of 0.2 to 5% by weight. Usually water is added 0.5 to 10 times, preferably 1 to 5 times, in part by weight, the amount of an acid added. An amount of water added is determined within the said ranges in consideration of work efficiency.

As described above, in the present invention, preferred is a 2-step reaction procedure that the elimination reaction is carried out at a relatively high temperature at first and, when the degree of deprotection reaches the target value, the temperature is lowered for the reaction to carry on. The elimination reaction rate greatly depends on temperature. The tendency is very outstanding particularly when a certain amount of moisture is present in the reaction system (retarding effect). The present invention, making use of this phenomenon, provides a method for tracking the progress of the elimination reaction easily and accurately: The elimination reaction of Step (2) proceeds slowly if the temperature is kept within a specified range and a specified amount of water is present in the reaction system. The curve of reaction time versus reaction rate becomes very gentle, which enables accurate prediction of the reaction end point.

The progress of the elimination reaction can be determined by measuring, for example, $^1$H-NMR, $^{13}$C-NMR or IR spectra. Of them, measurements of $^{13}$C-NMR spectra are preferred to determine the degree of deprotection accurately, but are disadvantageous as a reaction tracking method because it takes a long time to measure. A preferred method is that the relation between a ratio of signal absorbances on an IR spectrum and the degree of deprotection measured by $^{13}$C-NMR is made clear beforehand and IR spectra are used to track the reaction progress.

When the degree of deprotection reaches the target value in the elimination reaction, an addition of an alkali reagent, such as pyridine or aqueous ammonia, to the reaction system terminates the reaction. After this, ordinary isolation and purification procedures give the target product. Polymer (A) produced by the process described above has the same polymerization degree and molecular weight distribution as those of Polymer (B) used for the reaction, thanks to no side reactions occurring in the elimination reaction.

The protecting group of the phenolic hydroxyl group can be eliminated from any position if the condition of the molar ratio (IB/IA) of Repeating Unit (IB) to Repeating Unit (IA) to be 98/2 to 30/70 is met in Polymer (A).

The molecular weight of Polymer (A) can be measured by gel permeation chromatography (GPC), vapor pressure osmometer (VPO) or the like. Its molecular weight distribution is determined by GPC. The structure is easily confirmed by such a means as $^1$H-NMR, $^{13}$C-NMR or IR spectroscopy.

Best Forms to Implement the Invention:

The present invention is described in more detail in reference to Examples, but not limited to the following examples. Various changes of solvents, type of acid catalyst, an amount of water added, reaction temperature, reaction time and other conditions may be made at discretion without departing from the scope of the present invention. In the examples and comparative example, p-hyroxystyrene is abbreviated as "PHS" and p-tert-butoxystyrene as "PTBST", and "degree of deprotection=x %" refers to elimination of x mol % out of the whole tert-butoxy groups.

EXAMPLE 1

Preparation of poly(PHS/PTBST Copolymer) with the Degree of Deprotection=80%

100 g of poly-PTBST (Mn=18,000 and Mw/Mn=1.12) synthesized by living anion polymerization was dissolved in a mixed solvent of toluene and ethanol at a toluene/ethanol ratio by weight of 1/3 to give 285 g of a resin solution of 35% by weight in concentration. (The moisture content of the resin solution was 0.42% by weight.)

The obtained resin solution was raised to a temperature of 64 to 67° C., and 3 g (0.017 moles of sulfuric acid to a mole of tert-butoxy group) of a solution of concentrated sulfuric acid diluted with pure water at a sulfuric acid/water ratio by weight of 1/2 was added. The reaction of Step (1) started. (The whole moisture content of the reaction system was 1.11% by weight.) To check the progress of the reaction, a sample was taken from the reaction solution at regular intervals and analyzed to determine the degree of deprotection with a calibration curve prepared beforehand that showed the relation between a ratio of the absorbance at 897 $cm^{-1}$ to that at 831 $cm^{-1}$ on an IR spectrum and the degree of deprotection. It was confirmed that the degree of deprotection reached about 70% 3 hours later, and the reaction temperature was lowered to 45 to 48° C. to start the reaction of Step (2). While the reaction proceeded, a sample was taken from the reaction solution at regular intervals. An IR absorbance ratio was calculated to analyze the elimination reaction rate. It was confirmed that the degree of deprotection reached about 78% 5 hours after the reaction of Step (2) started. One hour after that time, 2 g of pyridine was added to terminate the reaction.

The reaction solution was repeatedly separated and washed with ethyl acetate and water. The organic layer was concentrated. The solvent was replaced with ethanol. The resulting solution was poured into a large quantity of water. The deposited polymer was separated by filtration, washed with water and dried under reduced pressure at 70° C. for 15 hours to give 74 g of white powder polymer.

The obtained polymer was measured by $^{13}$C-NMR. A degree of deprotection was calculated from the ratio of the area of the signal assigned to the carbon at the meta position of the aromatic ring of the PHS unit in the vicinity of 114 ppm, to that of the signal assigned to the carbon at the meta position of the aromatic ring of the PTBST unit at near 123 ppm. It was 79.8%, very close to the set value of 80%. This showed accurate control of the elimination reaction.

EXAMPLE 2

Preparation of Poly(PHS/PTBST Copolymer) with the Degree of Deprotection=60%

100 g of poly-PTBST (Mn=18,000 and Mw/Mn=1.65) synthesized by radical polymerization was dissolved in a mixed solvent of toluene and ethanol at a toluene/ethanol ratio by weight of 1/1 to give 270 g of a resin solution of 37% by weight in concentration. (The moisture content of the resin solution was 0.40% by weight.)

The obtained resin solution was raised to a temperature of 60 to 63° C., and 4 g (0.017 moles of sulfuric acid to a mole of tert-butoxy group) of a solution of concentrated sulfuric acid diluted with ethanol at a sulfuric acid/ethanol ratio by weight of 1/3 was added. The reaction of Step (1) started. (The moisture content of the reaction system was 0.40% by weight.) When the degree of deprotection reached about 50% 1.5 hours later, 2 g of water was added to the reaction system and the reaction temperature was lowered to 45 to 48° C. to start the reaction of Step (2). (The whole moisture content of the reaction system was 1.11% by weight.) It was confirmed that the degree of deprotection reached about 58% 4 hours after the reaction started. One hour after that time, 2 g of pyridine was added to terminate the reaction. The reaction progress was tracked with the calibration curve showing the relation between the absorbance ratio of the signals on an IR spectrum and the degree of deprotection in the same way as that in Example 1.

Upon the completion of the reaction, post-treatments same as those used in Example 1 produced 80 g of white powder polymer. Measurements of the obtained polymer by $^{13}$C-NMR showed the degree of deprotection to be 60.5%, very close to the set value of 60%. This showed accurate control of the elimination reaction.

EXAMPLE 3

Preparation of Poly(PHS/PTBST/Styrene Copolymer) with the Degree of Deprotection=75%

100 g of poly(PTBST/styrene copolymer) (Mn=8,500, Mw/Mn=1.08 and styrene content=20% by weight) synthesized by living anion polymerization was dissolved in a mixed solvent of toluene and ethanol at a toluene/ethanol ratio by weight of 1/1 to give 333 g of a resin solution of 30% by weight in concentration. (The moisture content of the resin solution was 0.50% by weight.)

The obtained resin solution was raised to a temperature of 55 to 58° C., and 4.8 g (0.035 moles of sulfuric acid to a mole of tert-butoxy group) of a solution of concentrated sulfuric acid diluted with pure water at a sulfuric acid/water ratio by weight of 1/2 was added. The reaction of Step (1) started. (The whole moisture content of the reaction system was 1.44% by weight.) It was confirmed 5 hours later that the degree of deprotection reached about 65%. Then, the reaction temperature was lowered to 47 to 50° C. to start the reaction of Step (2). The degree of deprotection was confirmed to have reached about 73% 3 hours after the reaction started. One hour after that time, 3.5 g of pyridine was added to terminate the reaction. The reaction progress was tracked with the calibration curve showing the relation between the absorbance ratio of the signals on an IR spectrum and the degree of deprotection in the same way as that in Example 1.

Upon the completion of the reaction, post-treatments same as those used in Example 1 produced 80 g of white powder polymer. Measurements of the obtained polymer by $^{13}$C-NMR showed the degree of deprotection to be 74.2%, very close to the set value of 75%. This showed accurate control of the elimination reaction.

EXAMPLE 4

Preparation of Poly(PHS/PTBST/Butyl Methacrylate Copolymer) with the Degree of Deprotection=60%

100 g of poly(PTBST/t-butyl methacrylate) (Mn=8,500, Mw/Mn=1.17 and the content of t-butyl methacrylate is 10% by weight of the block copolymer) synthesized by living anion polymerization was dissolved in a mixed solvent of toluene and ethanol at a toluene/ethanol ratio by weight of 1/2 to give 285 g of a resin solution of 35% by weight in concentration. (The moisture content of the resin solution was 0.45% by weight.)

The obtained resin solution was raised to a temperature of 64 to 67° C., and 3 g (0.020 moles of sulfuric acid to a mole of tert-butoxy group in a PTBST unit) of a solution of concentrated sulfuric acid diluted with pure water at a sulfuric acid/water ratio by weight of 1/2 was added. The reaction of Step (1) started. (The whole moisture content of the reaction system was 1.14% by weight.) When it was confirmed that the degree of deprotection reached about 45% 2 hours later, the reaction temperature was lowered to 45 to 47° C. to start the reaction of Step (2). It was confirmed 5.5 hours after the reaction started that the degree of deprotection reached about 58%. One hour after that time, 2 g of pyridine was added to terminate the reaction. The reaction progress was tracked with the calibration curve showing the relation between the absorbance ratio of the signals on an IR spectrum and the degree of deprotection in the same way as that in Example 1.

Upon the completion of the reaction, post-treatments same as those used in Example 1 produced 82 g of white powder polymer. Measurements of the obtained polymer by $^{13}$C-NMR showed the degree of deprotection to be 59.5%, very close to the set value of 60%. This showed accurate control of the elimination reaction.

COMPARATIVE EXAMPLE 1

Preparation of Poly(PHS/PTBST Copolymer) with the Degree of Deprotection=80%

100 g of poly-PTBST, the same as that used in Example 1, was dissolved in acetone to give 285 g of a resin solution of 35% by weight in concentration. (The moisture content of the resin solution was 0.1% by weight.)

The obtained resin solution was raised to a temperature of 50 to 53° C., and 18 g (0.1 moles of sulfuric acid to a mole of tert-butoxy group) of a solution of concentrated sulfuric acid diluted with acetone at a sulfuric acid/acetone ratio by weight of 1/2 was added. The elimination reaction started. The reaction progress was tracked in the same way as that used in Example 1. The elimination proceeded very slowly. It was confirmed that the degree of deprotection reached about 77% 50 minutes after the reaction started. Ten minutes after the sample was taken (the total reaction time was 1 hour), 2 g of pyridine was added to terminate the reaction. Upon the completion of the reaction, post-treatments same as those used in Example 1 produced 72 g of white powder polymer.

Measurements of the obtained polymer by $^{13}$C-NMR showed the degree of deprotection to be 85.4%, a big difference from the set value of 80%. The accuracy of the elimination reaction control was extremely inferior to that of Example 1.

Applicability in Industry

As described above, the present invention provides processes for the preparation of partially protected poly (hydroxystyrene)s in which the protection degree of the phenolic hydroxyl group is controlled easily and accurately without fail. The partially protected poly(hydroxystyrene)s are polymers used as resist materials. Use of the processes of the present invention makes it possible to stably supply such polymers with high quality. This invention is thus very useful in industry.

What is claimed:

1. A process for the preparation of partially protected poly(hydroxystyrene)s characterized in that it is a process for producing Polymer (A) having a repeating unit represented by Formula (IA)

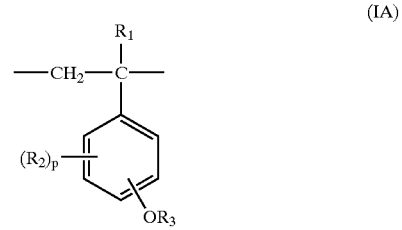

wherein, $R_1$ is hydrogen or methyl, $R_2$ is alkyl having 1 to 6 carbons, $R_3$ is an acid-decomposable or -eliminable group and p is 0, 1 or 2, and $R_2$ may be the same or different when p is 2, and a repeating unit represented by Formula (IB)

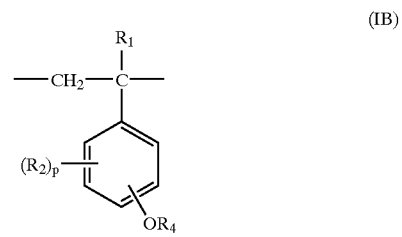

wherein, $R_1$, $R_2$ and p are as defined above, and $R_4$ is hydrogen or a group derived from $R_3$ by decomposition with an acid at a molar ratio (IB/IA) of 98/2 to 30/70 in a molecule, and the process contains a step that Polymer (B) having a repeating unit represented by Formula (II)

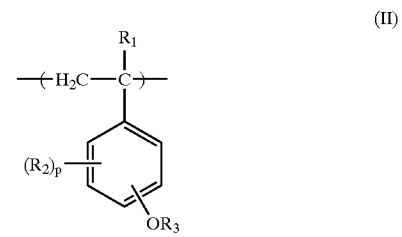

wherein, $R_1$, $R_2$, $R_3$ and p are as defined above in a molecule is reacted in an organic solvent with an acid which is diluted with a dilluent to 10% to 70% by weight added at a molar ratio of 0.0001 equivalents or more and less than 0.05 equivalents to the $OR_3$ group.

2. A process for the preparation of the partially protected poly(hydroxystyrene)s according to claim 1 in which sulfuric acid is used as the acid.

3. A process for the preparation of the partially protected poly(hydroxystyrene)s according to claim 1 in which water is used as the diluent.

4. A process for the preparation of the partially protected poly(hydroxystyrene)s according to claim 1 in which an alcohol having 1 to 4 carbons is used as the diluent.

5. A process for the preparation of the partially protected poly(hydroxystyrene)s according to claim 1, in which a mixed organic solvent consisting of a solvent (S1) in which the solubility of Polymer (A) is relatively high and that of Polymer (B) is relatively low and a solvent (S2) in which the solubility of Polymer (A) is relatively low and that of Polymer (B) is relatively high is used as the organic solvent.

6. A process for the preparation of the partially protected poly(hydroxystyrene)s according to claim 1, in which a mixed solvent of an aromatic hydrocarbon and an alcohol having 1 to 4 carbons is used as the organic solvent.

7. A process for the preparation of the partially protected poly(hydroxystyrene)s according to claim 1, in which a mixed solvent of an aromatic hydrocarbon and an alcohol having 1 to 4 carbons at a mixing ratio by weight of 4/1 to 1/4 is used as the organic solvent.

8. A process for the preparation of the partially protected poly(hydroxystyrene)s according to claim 1, in which the step that an acid is added to Polymer (B) to react in an organic solvent consists of Step (1) that Polymer (B) is reacted at a specified temperature (T1) and Step (2) that the polymer is reacted at a specified temperature (T2) lower than (T1).

9. A process for the preparation of partially protected poly(hydroxystyrene)s characterized in that it is a process for producing Polymer (A) having a repeating unit represented by Formula (IA)

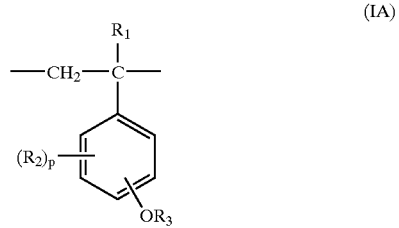

wherein, $R_1$ is hydrogen or methyl, $R_2$ is alkyl having 1 to 6 carbons, $R_3$ is an acid-decomposable or -eliminable group and p is 0, 1 or 2, and $R_2$ may be the same or different when p is 2, and a repeating unit represented by formula (IB)

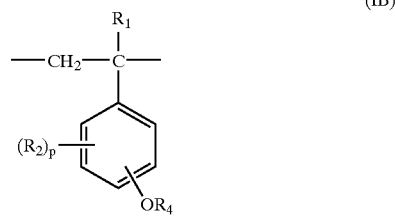

wherein, $R_1$, $R_2$ and p are as defined above, and $R_4$ is hydrogen or a group derived from $R_3$ by decomposition with an acid at a molar ratio (IB/IA) of 98/2 to 30/70 in a molecule, and the process contains Step (1) that Polymer (B) having a repeating unit represented by Formula (II)

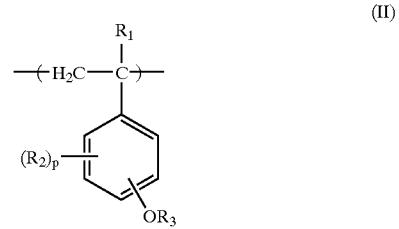

wherein, $R_1$, $R_2$, $R_3$ and p are as defined above in a molecule is reacted with an acid at a specified temperature (T1) and Step (2) that the polymer is reacted with the acid at a temperature (T2) lower than (T1).

10. A process for the preparation of the partially protected poly(hydroxystyrene)s according to claim 9 in which Step (1) that Polymer (B) is reacted at a specified temperature (T1) is carried out prior to Step (2) that the polymer is reacted at a specified temperature (T2) lower than (T1).

11. A process for the preparation of the partially protected poly(hydroxystyrene)s according to claim 9, in which the specified temperature (T1) is 50 to 80° C.

12. A process for the preparation of the partially protected poly(hydroxystyrene)s according to claim 9, in which the specified temperature (T2) is 40 to 60° C.

13. A process for the preparation of the partially protected poly(hydroxystyrene)s according to claim 9, in which Step (1) is a step for decomposing or eliminating 60 to 90% of the $OR_3$ group necessary to decompose or remove finally.

14. A process for the preparation of the partially protected poly(hydroxystyrene)s according to claim 9, in which Step (2) is a step that the reaction is carried out by adding a certain amount of water to the reaction solution.

15. A process for the preparation of the partially protected poly(hydroxystyrene)s according to claim 14 in which Step (2) is a step that water of 0.5 to 10 times, in part by weight, the amount of the acid is added to the reaction solution to carry out the reaction.

16. A process for the preparation of the partially protected poly(hydroxystyrene)s according to claim 9, in which Polymers (A) and (B) have, in addition to the said repeating units, a repeating unit of Formula (III)

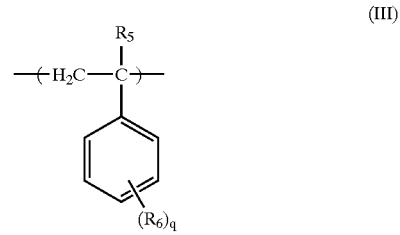

wherein, $R_5$ is hydrogen or methyl, $R_6$ is alkyl having 1 to 6 carbons, q is 0, 1 or 2, and $R_6$ may be the same or different when q is 2 in a molecule.

17. A process for the preparation of the partially protected poly(hydroxystyrene)s according to one of claims 16, in which Polymers (A) and (B) have, in addition to the said repeating units, a repeating unit of Formula (IV)

wherein, $R_7$ is hydrogen or methyl, $R_8$ is alkyl having 1 to 12 carbons, a group represented by Formula $CO_2R_9$ wherein, $R_9$ is alkyl having 1 to 12 carbons, hydrocarbon having an alicyclic skeleton of 3 carbons or more, aryl or heteroaryl, CN, a group represented by CONr1r2, wherein, r1 and r2 are, each independently, hydrogen or optionally substituted alkyl having 1 to 12 carbons, hydrocarbon having an alicyclic skeleton of 3 carbons or more or heteroaryl in a molecule.

18. A process for the preparation of the partially protected poly(hydroxystyrene)s according to claim 17, in which Polymers (A) and (B) have, in addition to the said repeating units, the repeating units of Formulae (III) and (IV) in a molecule.

19. A process for the preparation of the partially protected poly(hydroxystyrene)s according to claim 9, in which Polymer (B) has a number-average molecular weight of 1,000 to 50,000.

20. A process for the preparation of the partially protected poly(hydroxystyrene)s according to claim 8, in which Step (1) that Polymer (B) is reacted at a specified temperature (T1) is carried out prior to Step (2) that the polymer is reacted at a specified temperature (T2) lower than (T1).

21. A process for the preparation of the partially protected poly(hydroxystyrene)s according to claim 8, in which the specified temperature (T1) is 50 to 80° C.

22. A process for the preparation of the partially protected poly(hydroxystyrene)s according to claim 8, in which the specified temperature (T2) is 40 to 60° C.

23. A process for the preparation of the partially protected poly(hydroxystyrene)s according to claim 8, in which Step (1) is a step for decomposing or eliminating 60 to 90% of the $OR_3$ group necessary to decompose or remove finally.

24. A process for the preparation of the partially protected poly(hydroxystyrene)s according to claim 8, in which Step (2) is a step that the reaction is carried out by adding a certain amount of water to the reaction solution.

25. A process for the preparation of the partially protected poly(hydroxystyrene)s according to claim 8, in which Step (2) is a step that water of 0.5 to 10 times, in part by weight, the amount of the acid is added to the reaction solution to carry out the reaction.

26. A process for the preparation of the partially protected poly(hydroxystyrene)s according to claim 1, in which Polymers (A) and (B) have, in addition to the said repeating units, a repeating unit of Formula (III)

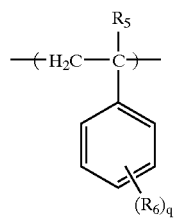

(III)

wherein, $R_5$ is hydrogen or methyl, $R_6$ is alkyl having 1 to 6 carbons, q is 0, 1 or 2, and $R_6$ may be the same or different when q is 2 in a molecule.

27. A process for the preparation of the partially protected poly(hydroxystyrene)s according to claim 26, in which Polymers (A) and (B) have, in addition to the said repeating units, a repeating unit of Formula (IV)

(IV)

wherein, $R_7$ is hydrogen or methyl, $R_8$ is alkyl having 1 to 12 carbons, a group represented by Formula $CO_2R_9$, wherein, $R_9$ is alkyl having 1 to 12 carbons, hydrocarbon having an alicyclic skeleton of 3 carbons or more, aryl or heteroaryl, CN, a group represented by CONr1r2, wherein, r1 and r2 are, each independently, hydrogen or optionally substituted alkyl having 1 to 12 carbons, hydrocarbon having an alicyclic skeleton of 3 carbons or more or heteroaryl in a molecule.

28. A process for the preparation of the partially protected poly(hydroxystyrene)s according to claim 27, in which Polymers (A) and (B) have, in addition to the said repeating units, the repeating units of Formulae (III) and (IV) in a molecule.

29. A process for the preparation of the partially protected poly(hydroxystyrene)s according to claim 9, in which Polymer (B) has a number-average molecular weight of 1,000 to 50,000.

* * * * *